United States Patent
Billard et al.

(10) Patent No.: US 6,540,352 B2
(45) Date of Patent: Apr. 1, 2003

(54) NONCORRECTIVE PRISM COMPENSATING LENS AND EYEGLASS PROVIDED WITH SAID LENS

(75) Inventors: Etienne Billard, Saint Claude (FR); Alain Ravier, Saint Claude (FR)

(73) Assignee: Christian Dalloz Sunoptics, Saint-Claude Cedex (FR)

(*) Notice: Subject to any disclaimer, the term of this patent is extended or adjusted under 35 U.S.C. 154(b) by 0 days.

(21) Appl. No.: 09/789,838

(22) Filed: Feb. 22, 2001

(65) Prior Publication Data
US 2001/0038437 A1 Nov. 8, 2001

Related U.S. Application Data
(60) Provisional application No. 60/183,959, filed on Feb. 22, 2000.

(51) Int. Cl.[7] .................................................. G02C 7/02
(52) U.S. Cl. .......................................... 351/159; 351/41
(58) Field of Search ...................................... 351/41, 158

(56) References Cited

U.S. PATENT DOCUMENTS

| | | | |
|---|---|---|---|
| 1,741,536 A | 12/1929 | Rayton | 351/159 |
| 5,648,832 A | 7/1997 | Houston et al. | 351/159 |
| 5,689,323 A | 11/1997 | Houston et al. | 351/41 |
| 5,805,263 A | 9/1998 | Reymondet et al. | 351/159 |
| 6,129,435 A * | 10/2000 | Reichow et al. | 351/159 |
| 6,338,558 B1 | 1/2002 | Kita | 351/159 |

FOREIGN PATENT DOCUMENTS

| | | |
|---|---|---|
| WO | WO 97/35224 | 9/1997 |
| WO | WO 99/52480 | 10/1999 |

* cited by examiner

*Primary Examiner*—Scott J. Sugarman
(74) *Attorney, Agent, or Firm*—Oliff & Berridge, PLC

(57) ABSTRACT

This lens is mounted in a frame having two earpieces and composed of two spherical surfaces (6, 8) and an optical center. In the standard wearing position in which a horizontal line connects the center of the pupil of the eye to an area of the ear on which an earpiece of the frame rests, the optical axis defined by the line passing through the two centers of the spherical surfaces makes an angle of at least 10° with a horizontal axis.

6 Claims, 3 Drawing Sheets

NONCORRECTIVE PRISM COMPENSATING LENS AND EYEGLASS PROVIDED WITH SAID LENS

CROSS-REFERENCE TO RELATED APPLICATION

This is a nonprovisional application of Provisional Application No. 60/183,959 filed on Feb. 22, 2000, which is hereby incorporated by reference.

BACKGROUND OF THE INVENTION

1. Field of Invention

The present invention relates to a noncorrective eyeglass lens as well as a pair of eyeglasses fitted with such a lens.

2. Description of Related Art

A noncorrective eyeglass lens generally has an external surface and an internal surface both of which are portions of a sphere. These two spheres have different radii and different centers. Gullstrand's law enables the power of such a lens to be calculated as a function of the radii of the spheres, from the positions of the centers of these spheres, and from the index of the material used to make the lens. For a noncorrective lens, a power of zero is chosen so that there is a relationship between the radii of curvature of the surfaces, the positions of the centers of the spheres corresponding to these surfaces, and the index of the material used. Current technological means provide full control of the power of a lens and enable products to be made with power tolerances of approximately 1/100 diopter.

A continuing concern in the production of noncorrective lenses is to minimize prism defects. These defects increase in size with the curvature of the lens. The present invention relates to such lenses. For a lens whose radius of curvature of the external surface is equal to a maximum of approximately 90 mm, prism defects are more problematic and the invention thus relates particularly but not exclusively to these lenses.

U.S. Pat. No. 1,741,536 describes the necessity of decentering the optical center relative to the visual center of a fitted lens to avoid prism defects. The basic idea is that the optical axis of the lens must always be parallel to the main visual axis. This US patent describes in particular the application of this principle to lenses with a large face angle requiring decentering on the horizontal plane.

U.S. Pat. Nos. 5,648,832 and 5,689,323 take up the principle stated in the previous patent, applying it to eyeglasses with large pantoscopic angles requiring decentering in the vertical plane of the optical center relative to the visual center. The pantoscopic angle can be defined as the angle between a vertical plane and a plane on which the edge of the lens rests when the eyeglass is in position on a wearer. These two patents teach decentering toward the top of the lens.

The use of vertical decentering toward the top of the optical center of a lens optimizes and even eliminates the prism defect at the visual center. The purpose of vertical decentering or positioning of the optical center toward the top of the lens is to meet various international standards that consider only the main visual axis as the measuring axis to evaluate the quality of eyewear equipped with noncorrective lenses. However, this optimization creates a substantial prism defect at the bottom of the lens. Thus, if the wearer of such eyeglasses looks at his feet for example by casting his eyes down rather than bowing his head, the prism defect of the lower part of the lens gives him the impression that the ground is slipping away underneath his feet. The more pronounced the curvature of the lens, the more marked is this phenomenon.

SUMMARY OF THE INVENTION

The present invention thus sets out to correct this defect and provide an eyeglass lens that decreases the prism deviation observed at the bottom of the lens without this prism deviation becoming large at another point on the lens.

For this purpose, it proposes a noncorrective eyeglass lens designed to be fitted into a frame having two earpieces and composed of two spherical surfaces and an optical center.

According to the invention, in the standard wearing position in which a horizontal line connects the center of the pupil of the eye to an area of the ear on which an earpiece of the frame rests, the optical axis defined by the line passing through the two centers of the spherical surfaces makes an angle of at least 10° with a horizontal axis.

Such an eyeglass lens thus has a low prism value along the main visual axis. This low value remains within the tolerances accepted by profession-wide standards and is not annoying to the eyeglass wearer. On the other hand, the prism deviation applied by the lens to a light beam passing through the lower peripheral area is decreased: an eyeglass wearer looking down at his feet for example does not feel that the ground is slipping away from under him.

This result is true in particular for a lens with a strong curvature corresponding to a radius of curvature of no more than approximately 90 mm.

To complete this result, the lens according to the invention advantageously has a negative power of between −0.12 and −0.04 diopter. This power is preferably between −0.06 and −0.04 diopter. This low power is not perceptible to the eyeglass wearer but makes a substantial contribution to decreasing the prism defect in the bottom of the lens.

The lens thickness at the optical center is preferably between 1 and 3 mm so that thin lenses are obtainable.

The optical axis of the lens, in the fitted and worn position, is preferably inclined downward relative to the horizontal axis corresponding to a line passing from the pupil of the eyeglass wearer's eye to the area of the ear on which the earpiece of the frame rests. This runs counter to the teachings of the above-cited patents in which the optical axis is substantially parallel to the horizontal axis defined above.

The invention relates in particular to an eyeglass having a frame with two earpieces and two lenses according to the invention.

In any event, the invention will be properly understood from the description hereinbelow referring to the attached schematic drawings that show one embodiment of an eyeglass lens according to the invention as a nonlimiting example.

DETAILED DESCRIPTION OF PREFERRED EMBODIMENTS

Figure 1:
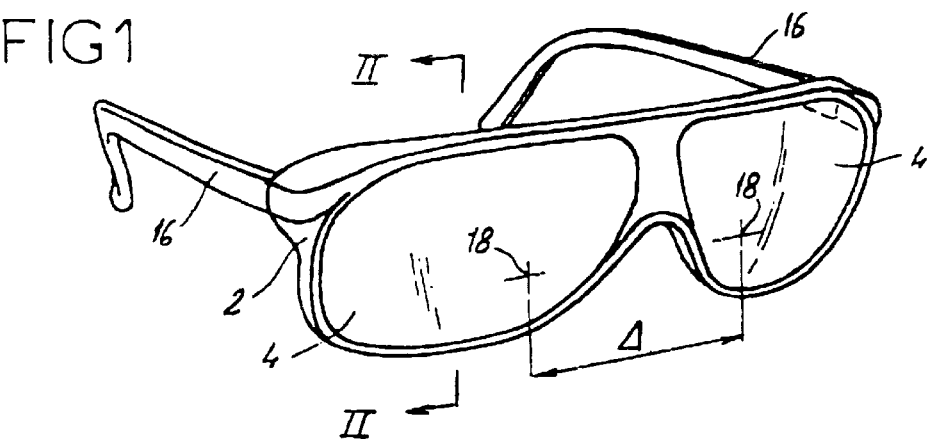
FIG. 1 shows an eyeglass in perspective.

FIG. 1 shows an eyeglass having a frame 2 and two lenses 4 made according to the invention. These lenses are non-corrective lenses, for sunglasses for example. Of course the shape of the frame and the lenses is provided for illustration only and imposes no limitation on the scope of the patent application. Each lens 4 has a concave inner face 6 and a convex outer face 8. The inner and outer faces are both spherical in shape. Outer face 8 corresponds to a sphere with center C1 and radius R1 while inner face 6 corresponds to a sphere with radius R2 and center C2. Centers C1 and C2 are offset and define a line 10 classically termed "optical axis." At the intersection of optical axis 10 with lens 4, the latter has a maximum thickness e. This thickness decreases progressively in the direction of the lens edge.

Radius R1 is chosen according to the desired shape of lens 4. For a 6 base lens, this radius will be 88 mm for example. Radius R2 and the distance between center C1 and center C2 are determined by Gullstrand's law. In the present case, these values are chosen to obtain a power of −0.05 diopter for example.

Figure 2:
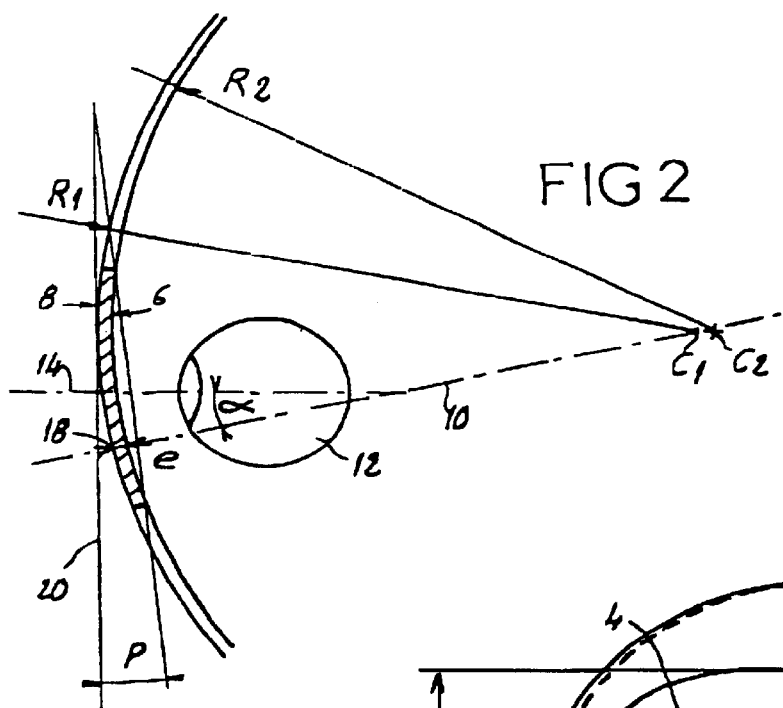
FIG. 2 is a cross section along line II—II in FIG. 1.

FIG. 2 shows a lens 4 in position in front of the eye 12 of an eyeglass wearer. This Fig. shows a horizontal axis 14 corresponding to the visual axis when the eye is looking at infinity, the head of the eyeglass wearer being straight. The horizontal axis is defined for example by a line passing through the pupil of the eye and through the area of the ear on which rests an earpiece 16 of frame 2. FIG. 2 shows an angle $\alpha$ between the optical axis and the horizontal plane.

Here it becomes necessary to call on a system of references.

Figure 5:
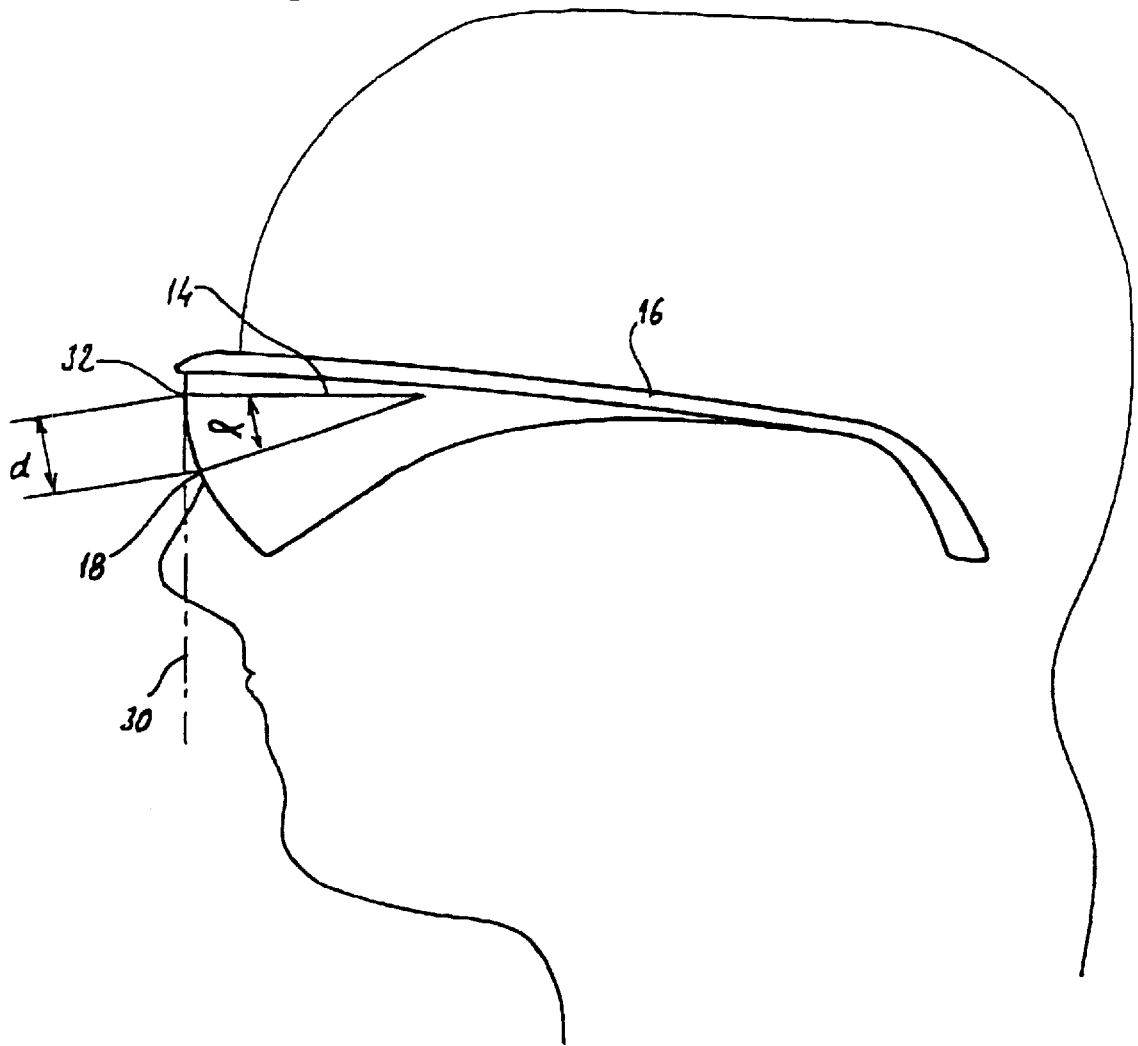
FIG. 5 shows a head on which an eyeglass according to the invention is positioned.

The system may be that used in certain standards. For example, ANSI Z87.1-1989 uses the 50th percentile Alderson head as a reference to the wearing position of an eyeglass. European Standard EN 168 also refers to a 50th percentile standard head developed by the UK Health and Safety Executive. In the first approximation it is assumed that, for these heads, a horizontal line connects the center of the pupil to the area of the ear on which eaipiece of the eyeglass rests. This line is generally called "main visual axis." It is generally described in standards and it is along this axis that optical measurements are made. FIG. 5 shows frame 2 in the wearing position as defined by the above-cited ANSI standard.

To determine the angle $\alpha$ referred to above, one can for example first mark the position of optical center 18 of lens 4. Then, in a vertical plane containing this optical center 18, a vertical line 30 tangential to the external surface 8, and point 32 of contact between external surface 8 and vertical line 30 is determined. If we choose the vertical plane passing both through the center of the external surface and through the optical center 18, the contact point 32 corresponds to the intersection of external surface 8 with a horizontal line, for example line 14, which passes through the center of external surface 8.

Once the tangent point 32 and optical center 18 have been determined, the distance d between them should then be measured. The angle $\alpha$ is then obtained by the formula $\alpha = 2 \arcsin(d/2R)$.

R is the radius of the outer surface and d is the distance between point 32 and the optical center 18.

The optical center 18 of lens 4 is located toward the bottom of the lens. In the embodiment of FIG. 2, optical center 18 is substantially in the lower fourth of lens 4. According to the invention, the optical center is usually in the lower half of the lens; the angle $\alpha$ formed by the optical axis and the horizontal has a value of at least 10 degrees.

In addition, as can be seen in FIG. 2, lens 4 is inclined to the vertical and has a pantoscopic angle of more than 5 degrees. This pantoscopic angle is the angle formed by vertical line 20 and a plane on which the inner face 6 of the lens would rest. This angle p is shown in FIG. 2.

Thus, when the eyeglass wearer looks straight ahead, the light beams arriving at eye 12 are slightly deflected. This deflection is small and does not interfere with vision. By comparison with the prior art documents, such a lens substantially improves vision when the eyeglass wearer looks downward. The lower part of the lens is favored here as it is also the part of the lens most used. This is because the eyes are usually looking straight forward, or downward. There is a morphological explanation for this. A precise or lengthy observation of an object above eye level is accompanied by an upward movement of the head so that the object to be observed is placed in the main visual axis of the lens, corresponding to axis 14 in FIG. 2. When an object is observed downward, the head moves but the lower area of the lens is more in use. When reading for example, an eyeglass wearer often looks through the lower parts of his eyeglass lenses.

The four tables below indicate the prism deviation for eyeglasses using 6 and 8 base lenses with and without a negative power of −0.05 diopter.

TABLE 1

6 BASE LENS, POWER 0 DIOPTER

| | $\alpha = 0°$ | $\alpha = 6.5°$ | $\alpha = 13°$ |
|---|---|---|---|
| Prism along visual axis | 0 | 0.1 | 0.2 |
| Prism along bottom of lens | 0.80 | 0.7 | 0.6 |

TABLE 2

6 BASE, POWER −0.05 DIOPTER

| | $\alpha = 0°$ | $\alpha = 6.5°$ | $\alpha = 13°$ | $\alpha = 20°$ |
|---|---|---|---|---|
| Prism along visual axis | 0.05 | 0.1 | 0.15 | 0.2 |
| Prism along bottom of lens | 0.65 | 0.6 | 0.55 | 0.5 |

TABLE 3

8 BASE LENS, POWER 0 DIOPTER

| | $\alpha = 0°$ | $\alpha = 6°$ | $\alpha = 10°$ | $\alpha = 13°$ |
|---|---|---|---|---|
| Prism along visual axis | 0 | 0.15 | 0.2 | 0.27 |
| Prism along bottom of lens | 0.1 | 0.95 | 0.9 | 0.85 |

TABLE 4

8 BASE LENS, POWER −0.05 DIOPTER

| | $\alpha = 0°$ | $\alpha = 6°$ | $\alpha = 10°$ | $\alpha = 13°$ |
|---|---|---|---|---|
| Prism along visual axis | 0.05 | 0.15 | 0.2 | 0.24 |
| Prism along bottom of lens | 0.9 | 0.85 | 0.8 | 0.75 |

These tables show that the prism value for a beam passing through the bottom of the lens is improved by shifting the optical axis (increasing angle α), by choosing a power of −0.05 diopter, and of course by combining these two parameters.

The two tables below indicate the prism deviation for eyeglasses using lenses with a negative power of 0.05 diopter with 6 and 8 base lenses. These calculations were based on a given hypothetical eye position relative to the lens and a hypothetical lens height. These are provided as an indication to show the improvement produced by the proposed invention. The values quoted will be different if different hypotheses are taken for the refractive index of the material, the lens thickness and height, the pantoscopic angle, etc.

The first table considers the light beam passing through the visual axis while the second table relates to the light beam passing through the bottom of the lens. For each table, three optical axis positions are considered:

the optical axis is horizontal, the optical axis passes through the middle of the lens. In this case the angle formed by optical axis 10 and horizontal visual axis 14 is 6.525° for a base 6 lens and 9.180° for a base 8 lens, the optical axis passes through the lower fourth of the lens. The angle between optical axis 10 and horizontal visual axis 14 is 12.96° for a base 6 lens and 17.67° for a base 8 lens.

TABLE 5

LIGHT BEAM PASSING THROUGH VISUAL AXIS

|  | HORIZONTAL OA | MIDDLE OA | Lower ¼ OA |
|---|---|---|---|
| Base 6 | 0.05 | 0.10 | 0.15 |
| Base 8 | 0.05 | 0.19 | 0.31 |

TABLE 6

LIGHT BEAM PASSING THROUGH BOTTOM OF LENS

|  | HORIZONTAL OA | MIDDLE OA | Lower ¼ OA |
|---|---|---|---|
| Base 6 | 0.66 | 0.61 | 0.55 |
| Base 8 | 0.91 | 0.79 | 0.66 |

It will readily be seen from these tables that the prism deviation at the bottom of the lens is greatly improved when the optical axis is inclined downward. This improvement is offset by the deterioration in prism value along the visual axis; the invention makes a compromise between the perceived prism values at various points of the lens. The values listed above were calculated for polycarbonate lenses.

The lenses according to the invention will have an optical axis inclined by 10 degrees or more to the horizontal. According to the chosen frame design, it will be noted that the intersection between the optical axis and the external surface of the lens is in the lower half of the latter (see FIG. 3). The upper limit for angle α is that corresponding to an excessive prism deviation along the visual axis. It can be seen for example that for a base 6 lens, the optical center can be placed right at the lower edge of the lens without thereby causing excessive deviation along the visual axis (see Tables 1 and 2).

Figure 3:
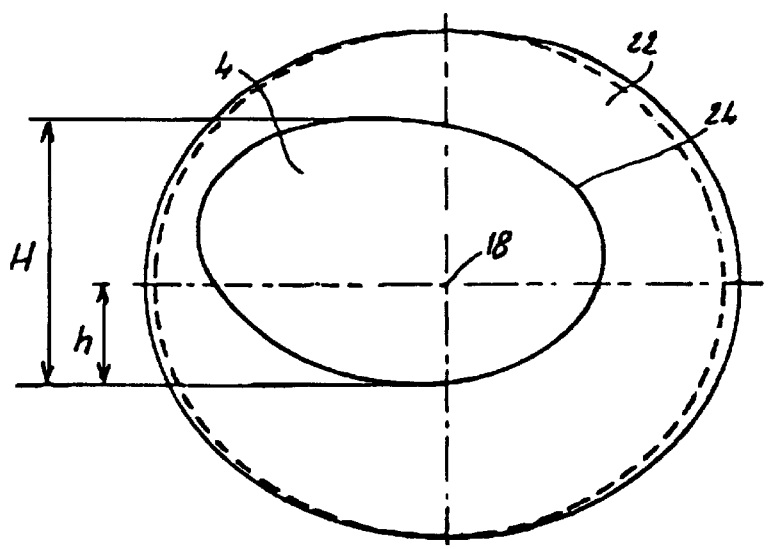
FIG. 3 is a front view of a circular blank for making a lens according to the invention.
Figure 4:
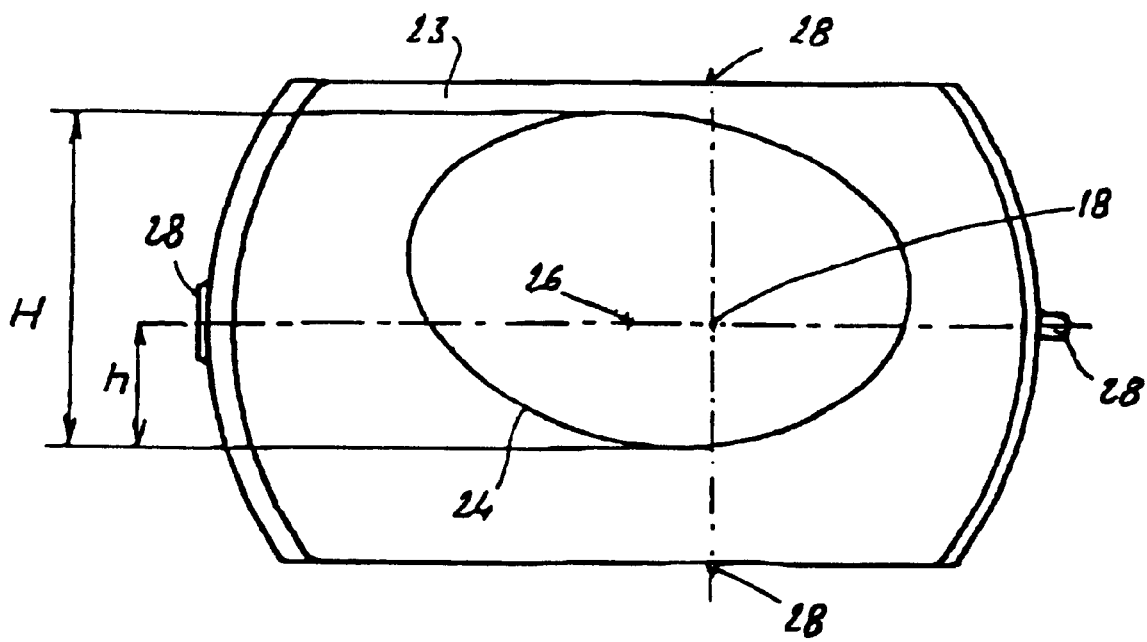
FIG. 4 shows a noncircular blank for making a lens according to the invention.

The lenses according to the invention are obtained for example from a blank 22 in the shape of a dome. Such a blank 22 has two spherical surfaces and is delimited by a peripheral edge. The spherical surfaces correspond to the inner 6 and outer 8 faces of lenses 4. FIG. 3 contains a trim line 24. This line has an upper edge and a lower edge and the vertical distance between these edges is called H. It corresponds to the geometric height of lens 4. The optical center 18 of the lens is in the geometric center of blank 22. Geometrically, it is located in the lower half of lens 4. The optical center here is located at a distance h from the lower edge of trim line 24. Height h is substantially equal to half the total height H of lens 4 in FIG. 3.

Eyeglass lens 4 can also be obtained from a blank 23 as described in document FR-2,740,341. The optical center 18 in this case is offset from the geometric center 26 of the blank. The latter is not circular. It has two opposite straight edges and two opposite edges in the shape of the arc of a circle. Position marks 28 allow optical center 18 to be positioned on blank 23. This figure shows the trim line 24 of the lens which is disposed relative to optical center 18 in the same way as for blank 22 in FIG. 3.

Once a right lens and a left lens have been trimmed, they are placed in frame 2 shown in FIG. 1. The optical centers of the two lenses 4 are then separated by a distance Δ. This distance Δ is for example less than the distance between the two pupils of the eyeglass wearer. The principle described in U.S. Pat. No. 1,741,536 cited in the preamble of the present application is then used to limit prism defects toward the side edges of the lens.

It goes without saying that the invention is not confined to the embodiments described above as nonlimiting examples; on the contrary it includes all alterative embodiments in the framework of the following claims.

Thus, for example, the power of the lenses can be different from −0.05 diopter. An angle different from the pantoscopic angle indicated as an example in the description may be chosen.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

What is claimed is:

1. A noncorrective eyeglass lens mountable in a frame having two earpieces, comprising:

two spherical surfaces, each having a center; and an optical axis corresponding to a line passing through the centers of the two spherical surfaces, wherein in a normal wearing position the optical axis is inclined downward at an angle of at least 10° but no more than 17° with a horizontal axis, which corresponds to a line passing through the center of the pupil of the eye of the frame wearer and the area of the ear on which the corresponding earpiece of the frame rests.

2. The noncorrective eyeglass lens according to claim 1, wherein the noncorrective eyeglass lens has a high degree of curvature corresponding to a radius of curvature equal to at most approximately 90 mm.

3. The noncorrective eyeglass lens according to claim 1, wherein the noncorrective eyeglass lens has a negative power of between −0.12 and −0.04 diopter.

4. The noncorrective eyeglass lens according to claim 3, wherein the power of the noncorrective lens is between −0.06 and −0.04 diopter.

5. The noncorrective eyeglass lens according to claim 1, further including an optical center, wherein the thickness of the noncorrective eyeglass lens at the optical center is between 1 and 3 mm.

6. Eyeglasses comprising a frame with two earpieces and two lenses, whereing the two lenses are noncorrective eyeglass lenses according to claim 1.

* * * * *